United States Patent [19]

Gosselin

[11] Patent Number: 4,942,199

[45] Date of Patent: Jul. 17, 1990

[54] METHOD OF SEALING BY INJECTING A MIXTURE BASED ON ACRYLAMIDE AND THE CORRESPONDING MIXTURE

[76] Inventor: Claude Gosselin, 18 Rue de Bousbecque, 59126 Linselles, France

[21] Appl. No.: 340,878

[22] Filed: Apr. 20, 1989

[30] Foreign Application Priority Data

Apr. 29, 1988 [FR] France ............................ 88 06075

[51] Int. Cl.$^5$ ............................................ C08K 5/29
[52] U.S. Cl. ................................. 524/724; 524/829
[58] Field of Search ............ 524/555, 850, 827, 724, 524/829; 405/263, 264, 269; 526/303.1

[56] References Cited

U.S. PATENT DOCUMENTS

| | | | |
|---|---|---|---|
| 3,847,858 | 11/1974 | Eilers et al. ........................ | 524/555 |
| 4,361,687 | 11/1982 | Arndt et al. ....................... | 524/850 |
| 4,366,194 | 12/1982 | Pilny et al. ........................ | 524/555 |
| 4,438,976 | 3/1984 | Baughman et al. ................ | 166/271 |
| 4,521,452 | 6/1985 | Highsmith ......................... | 405/264 |

FOREIGN PATENT DOCUMENTS 2553304 10/1983 France ............................... 405/269

OTHER PUBLICATIONS

*The Merck Index,* 9th Ed., Merck & Co., Inc., Rahway, 1976, pp. 1448/7042.

*Primary Examiner*—Joseph L. Schofer
*Assistant Examiner*—R. H. Delmendo
*Attorney, Agent, or Firm*—Shenier & O'Connor

[57] ABSTRACT

An aqueous solution of acrylamide is mixed with an aqueous solution containing a polymerization trigger. Firstly at least one of the solutions contains a color indicator having a given color in the solution based on acrylamide and a different color in the solution contained in the trigger, and whose color changeover zone corresponds to the optimum proportions of the reagents in solution. Secondly, during mixing, the respective quantities of the two solutions are adjusted to occupy the changeover zone of the color indicator such that the mixture takes up the color corresponding to the color of the indicator in the solution based on acrylamide. The mixture preferably contains acrylamide, methylenebisacrylamide, and triethanolamide glycol, using ammonium persulfate as the trigger and using bromophenol blue as the color indicator, with the color thereof disappearing after polymerization.

4 Claims, No Drawings

METHOD OF SEALING BY INJECTING A MIXTURE BASED ON ACRYLAMIDE AND THE CORRESPONDING MIXTURE

The present invention relates to sealing building work, in particular in concrete, and in particular building work which is constantly in damp surroundings, with sealing being performed by injecting a mixture of an aqueous solution based on acrylamide and a polymerization trigger.

BACKGROUND OF THE INVENTION

The cracks which appear in building works embedded in concrete have several causes: microcracking provoked or due to porous concrete, shrinkage cracks, cracks due to loads settling, to resumption of concreting, to construction joints, etc. Depending on the geographical location of the building work in question, these cracks are filled to a greater or lesser extent with water, and in general they remain constantly in a damp state.

In order to be effective, the sealing of building works must remove the water from the crack prior to stopping the crack. In conventional manner, use is made of the injection technique together with acrylic type resins which polymerize without difficulty in the presence of water. For example, the "Bulletin Technique de la Suisse Romande" of 27 July 1963 describes a mixture for sealing by injection, the mixture comprising an aqueous solution of acrylamide and of methylene bisacrylamide together with a redox catalyst. The mixture has the advantage of being easily injectable since its viscosity is close to that of water until it sets, and of being usable even under the dampest of conditions. In addition, its limiting strength is reached very quickly after it begins to set. However, in spite of these undoubted advantages, this mixture based on acrylamide is not widely used, apparently because of certain difficulties in implementing it.

On worksites, the two components, namely the acrylamide solution and the redox catalyst, are mixed by hand immediately before injection by non-specialized personnel without any verification means. Any mistake in the mixture proportions or any degradation of the catalyst can give rise to major consequences, particularly with respect to setting time which is initially selected as a function of the sealing problem to be solved. In addition, if the mixture contains excess redox catalyst, then the excess catalyst diffuses into the aqueous medium of the building work, and if that medium is reinforced concrete, then the steel structure therein is damaged.

A solution has already been proposed to this difficulty in implementation by providing a machine as described in French Pat. No. FR-A 83 16 253 in which the two components are fed, mixed, and injected automatically in an adjustable manner.

However, the difficulty is not completely overcome in the event of the machine malfunctioning or in the event of the operator setting it wrongly. There is no way of detecting such malfunctioning or wrong setting immediately.

SUMMARY OF THE INVENTION

The present invention provides a sealing method by means of injection which mitigates these difficulties encountered in practice. The method of the invention is of conventional type in which two aqueous solutions are mixed together, with one of the solutions being based on acrylamide and with the other containing a polymerization trigger, and with the mixture formed in this way then being injected in the zone to be sealed. According to the invention, at least one of the solutions contains a color indicator having a given color in the solution based on acrylamide and a different color in the solution contained in the trigger, and whose color changeover zone corresponds to the optimum proportions of the reagents in solution, and secondly, during mixing, the respective quantities of the two solutions are adjusted to occupy the changeover zone of the color indicator such that the mixture takes up the color corresponding to the color of the indicator in the solution based on acrylamide.

Thus, the presence of the color indicator makes it possible even for a non-specialized operator to visually observe that mixing is taking place properly.

Preferably, during mixing, excess solution containing the trigger is initially added so that the mixture takes up the color corresponding to the color of the indicator in the solution containing the trigger, after which the solution based on acrylamide is added progressively until a persistent color change is obtained.

By acting in this way, the operator can monitor visually during mixing whether or not the mixture is in the indicator changeover zone, i.e. in the zone corresponding to the optimum proportions of the reagents: acrylamide and trigger, without there being excess trigger relative to the acrylamide solution. Thus, by simple visual inspection, it is possible to ensure that injection into reinforced concrete will not degrade its steel structures.

Since the first aqueous solution is based on acrylamide and methylenebisacrylamide buffered with triethanolamide glycol, referred to below as TEAG, and the second aqueous solution is ammonium persulfate, the selected color indicator should have a changeover zone corresponding to a pH of about 8, e.g. it may be bromophenol blue which is blue in a basic medium and which turns pale yellow at a pH of less than 8.

Advantageously, in the method of the invention, injection is stopped when the colored mixture is seen to come out from the zone being sealed. The colored mixture serves as a tracer and serves to show up the mixture leaving the zone being sealed, after the mixture has replaced the infiltrating water.

In this case, it is preferable for the selected color indicator to loose its color after the acrylamide based solution has polymerized completely. This property avoids leaving colored marks on the outside portions of the sealed zone.

The invention will be better understood from reading the description given below with reference to examples of how the invention may be implemented.

DETAILED DESCRIPTION

The problem to be solved consists in sealing a crack existing in concrete building work embedded, for example, in an underground gallery which is permanently subjected to hydraulic pressure and to a temperature of about 20° C.

Two distinct receptacles are used, each containing an aqueous solution. The first can contains a blue-colored solution having the following composite by weight:

| acrylamide: | 57% |
| --- | --- |
| methylenebisacrylamide: | 3% |
| triethanolamide glycol (TEAG): | 5.6% |
| water: | 34.4% |
| bromophenol blue: | trace amounts |

The second can contains an aqueous solution having the following composition by weight:

| ammonium persulfate: | 1.8% |
| --- | --- |
| disodium phosphate: | 5% |
| trisodium phosphate: | 5% |
| water: | 88.2% |

The above compositions are designed so that an operator with conventional equipment mixes these two solutions in equal proportions. In practice, the operator makes the mixture by pouring the contents of both cans into a third receptacle which is provided with a mechanical stirrer. The mixture has a persistent blue color which corresponds to a slight excess of acrylamide solution in the changeover zone of bromophenol blue.

The operator loads the injection machine with the mixture formed in this way, causes the injection tubes to penetrate into drilled holes corresponding to the crack, and injects the mixture under low pressure into the sealing zone. The water which was previously contained in the crack is generally seen to escape in various places, after which the colored mixture appears, thereby indicating that the crack has been stopped, and the operator turns off the injection and withdraws the injection tube. A few minutes later, once the exothermal polymerization reaction of the acrylamide has been completed, the coloring due to the bromophenol blue fades away and the polymerized product is substantially translucent.

In the situation described above where conventional equipment is used, it is essential to limit the quantity of mixture used at any one time in order to take account of the danger of said mixture polymerizing prior to injection. This method of operating gives rise to uncertainty for the operator: depending on whether the crack to be sealed is large or small in size, the operator does not know in advance whether the quantity of mixture made up is going to be too little to completely stop the crack, or too much.

That is why it is recommended to use automatic injection equipment of the type described in French Pat. No. FR-A-83 16 253 which eliminates the constraint due to polymerization time. The automatic injection machine is adjusted as follows. The operator plunges two machine feed pipes into the two cans containing the acrylamide solution and the persulfate solution, respectively. The feed rates via the two pipes are then adjusted so that the mixture delivered by the injection tube is colorless. Thereafter the flow rate in the feed pipe corresponding to the acrylamide solution is increased until the output mixture is colored blue and stays blue. Thereafter, injection can be begun as above.

As can clearly be seen from the above description, the method of the invention makes it possible for an operator having little qualification to use the technique of injecting a sealing mixture based on acrylamide, without requiring sophisticated monitoring equipment. The solutions are ready for use, and optimum proportions of the ingredients are obtained by simple visual inspection by virtue of the mixture switching from one color to another. Further, the mixture colored in this way serves as a marker to indicate that injection is complete without spoiling the appearance of the building work since the color indicator loses its color after polymerization.

The invention is not limited to the implementation described above. In particular, the proportions of the various ingredients in this mixture may be varied as a function of the nature of the work to be sealed, of the water content of the work, and of ambient temperature. Also, other colored indicators may be used, e.g. bromocresol blue or phenol phthalein.

I claim:

1. A kit for sealing by injection comprising a first aqueous solution based on acrylamide, methylenebisacrylamide, and triethanolamide glycol and a second aqueous solution of a polymerization trigger, wherein at least one of the said solutions contains a color indicator which has a given color in the first aqueous solution and a different color in the second aqueous solution, said color indicator having a color changeover zone which corresponds to the optimum respective quantities of the two aqueous solutions for the polymerization reaction, the respective quantities of the two solutions being such that the obtained mixture takes up the color corresponding to the color of the indicator in the first aqueous solution.

2. A kit according to claim 1, wherein the color indicator has a changeover zone corresponding to a pH of about 8.

3. A kit according to claim 1, wherein the color indicator loses its color after the reagents have polymerized.

4. A kit according to claim 2, wherein the color indicator is bromophenol blue.

* * * * *